(12) United States Patent
Watanabe et al.

(10) Patent No.: US 8,596,442 B2
(45) Date of Patent: Dec. 3, 2013

(54) AUTOMATIC TRANSMISSION

(75) Inventors: Hidehiko Watanabe, Hiratsuka (JP);
Noboru Higakubo, Isehara (JP);
Masataka Sakaguchi, Zama (JP)

(73) Assignee: Jatco Ltd, Fuji-shi (JP)

( * ) Notice: Subject to any disclaimer, the term of this patent is extended or adjusted under 35 U.S.C. 154(b) by 553 days.

(21) Appl. No.: 12/816,797

(22) Filed: Jun. 16, 2010

(65) Prior Publication Data
US 2011/0015036 A1 Jan. 20, 2011

(30) Foreign Application Priority Data

Jul. 15, 2009 (JP) .................................. 2009-166442

(51) Int. Cl.
*B60T 1/06* (2006.01)
*F16H 63/34* (2006.01)

(52) U.S. Cl.
USPC ..................................... 192/219.5; 74/606 R

(58) Field of Classification Search
USPC ................ 192/219.5, 219.4; 74/411.5, 606 R
See application file for complete search history.

(56) References Cited

U.S. PATENT DOCUMENTS

| 3,601,230 | A | | 8/1971 | Piatz | |
|---|---|---|---|---|---|
| 3,729,075 | A | * | 4/1973 | Piret .......................... | 192/219.5 |
| 3,912,050 | A | | 10/1975 | Iwanaga et al. | |
| 4,606,242 | A | | 8/1986 | Hasegawa et al. | |
| 4,671,133 | A | * | 6/1987 | Yamada .......................... | 74/530 |
| 4,722,427 | A | * | 2/1988 | Prumbaum et al. ........ | 192/219.5 |
| 4,727,967 | A | | 3/1988 | Ogasawara et al. | |
| 5,649,457 | A | * | 7/1997 | Kudou et al. ............... | 74/606 R |
| 6,164,427 | A | * | 12/2000 | Ogawa ........................ | 192/219.5 |
| 2006/0070839 | A1 | * | 4/2006 | Sugano et al. ............. | 192/219.5 |

FOREIGN PATENT DOCUMENTS

| JP | 61-021851 A | 1/1986 |
|---|---|---|
| JP | 03-200458 A | 9/1991 |
| JP | 2003-276580 A | 10/2003 |
| JP | 2003-276581 A | 10/2003 |
| JP | 2005-119603 A | 5/2005 |
| JP | 2007-205383 A | 8/2007 |

* cited by examiner

*Primary Examiner* — David D Le
*Assistant Examiner* — Terry Chau
(74) *Attorney, Agent, or Firm* — Foley & Lardner LLP

(57) ABSTRACT

In an automatic transmission employing a parking-lock mechanism accommodated in a transmission casing for mechanically locking and unlocking a transmission output shaft of a speed-change system, the transmission casing includes a first casing and a second casing integrally connected to each other. A shift-lever-operated manual shaft and a cam-equipped parking rod are installed on the first casing, whereas a support actuator having a guide face for the cam and a pivotable parking pawl operated by the cam for meshed-engagement with a parking gear of the transmission output shaft when a specified longitudinal displacement of the parking rod has been reached are installed on the second casing. A temporary-retaining structure is provided on a transmission-output-shaft bearing retaining wall fixedly connected to a face of the first casing facing the second casing, for temporarily retaining the cam attached to the tip of the parking rod.

2 Claims, 6 Drawing Sheets

AUTOMATIC TRANSMISSION

TECHNICAL FIELD

The present invention relates to an automatic transmission having a parking-lock mechanism.

BACKGROUND ART

As is generally known, an automotive automatic transmission, which is configured to automatically accomplish upshifting and downshifting, employs a parking-lock mechanism installed in a transmission casing. The parking-lock mechanism is comprised of several internal linkages installed in the transmission casing, namely, a manual shaft, a parking-pawl-actuator rod (simply, a parking rod), a support actuator, and a parking pawl. The manual shaft is configured to rotate in synchronism with movement of a shift lever whose position is selectable by the driver. The parking rod is configured to displace in its longitudinal direction in synchronism with rotary motion of the manual shaft. The support actuator has a sloped face onto which a cam, attached to the tip of the parking rod, runs when a specified longitudinal displacement of the parking rod has been reached. The parking pawl is configured to be forced by the cam when the cam has run onto the sloped face of the support actuator, such that the parking pawl is brought into meshed-engagement with a parking-lock gear (simply, a parking gear) mounted on a transmission output shaft. One such parking-lock-mechanism equipped automatic transmission has been disclosed in Japanese Patent Provisional Publication No. 2007-205383 (hereinafter referred to as "JP2007-205383"). In the automatic transmission disclosed in JP2007-205383, the parking-lock mechanism is accommodated in the transmission casing, which casing includes a transmission case and a converter housing integrally connected to each other to form a housing. Additionally, all of component parts, constructing the parking-lock mechanism, are installed on the transmission case.

SUMMARY OF THE INVENTION

In the automatic transmission as disclosed in JP2007-205383, when a range gear position of the transmission is in a parking range in which the parking pawl is held in meshed-engagement with the parking-lock gear, a reaction force from the transmission output shaft via the parking pawl meshing with the parking-lock gear acts on the parking rod as well as the support actuator. The reaction force also acts on the transmission case on which the support actuator and the parking rod are both installed. As a result, in the P range, a load of no small magnitude tends to concentrate on the transmission case, and hence the mechanical strength of the transmission case must be increased. This leads to the problem of a considerable layout/design change in the internal structure of the transmission casing and/or the transmission-case shape. Hence, it is not easy to increase the strength of the transmission case as a countermeasure against the concentrated load.

Additionally, the parking-lock-mechanism equipped automatic transmission disclosed in JP2007-205383 also suffers from the disadvantages of a troublesome positioning of the parking-lock mechanism when installing on the transmission case, and undesirable deviations of the internal linkages constructing the parking-lock mechanism (e.g., the parking rod and the like), from their desired installation positions, in other words, the problem of the deteriorated assembly work when the transmission case and the converter housing are integrally connected to each other.

It is, therefore, in view of the previously-described disadvantages of the prior art, an object of the invention to provide an automatic transmission configured to ensure decentralization of a load (a reaction force) applied from a transmission output shaft through a parking-lock mechanism to a transmission casing without high localized load application to the transmission casing in a parking range, and also configured to enable more efficient assembly work of the parking-lock-mechanism equipped automatic transmission.

In order to accomplish the aforementioned and other objects of the present invention, an automatic transmission comprises a parking-lock mechanism accommodated in a transmission casing, for mechanically locking and unlocking a transmission output shaft of a speed-change system by engaging and disengaging the parking-lock mechanism with and from the transmission output shaft, wherein the transmission casing comprises a first casing and a second casing integrally connected to each other to form a housing configured to cover the speed-change system, the parking-lock mechanism comprises a manual shaft configured to rotate in synchronism with a driver's shift-lever operation, a parking rod whose longitudinal displacement is produced by rotary motion of the manual shaft, a support actuator onto which a cam, attached to a tip of the parking rod, runs when a specified longitudinal displacement of the parking rod has been reached, and a parking pawl configured to be pushed and moved by the cam when the cam has run onto the support actuator owing to the specified longitudinal displacement of the parking rod so that the parking pawl is brought into meshed-engagement with a parking gear installed on the transmission output shaft, the manual shaft and the parking rod are installed on the first casing, whereas the support actuator and the parking pawl are installed on the second casing, and a temporary-retaining structure is provided on a face of the first casing facing the second casing, for temporarily retaining the parking rod.

The other objects and features of this invention will become understood from the following description with reference to the accompanying drawings.

BRIEF DESCRIPTION OF THE DRAWINGS

FIG. 3A is a plan view illustrating the inside of a transmission case of the automatic transmission of the embodiment, whereas

FIG. 6A is a plan view illustrating a ribbed bearing retainer of the automatic transmission of the embodiment, whereas

DESCRIPTION OF THE PREFERRED EMBODIMENTS

Figure 1:
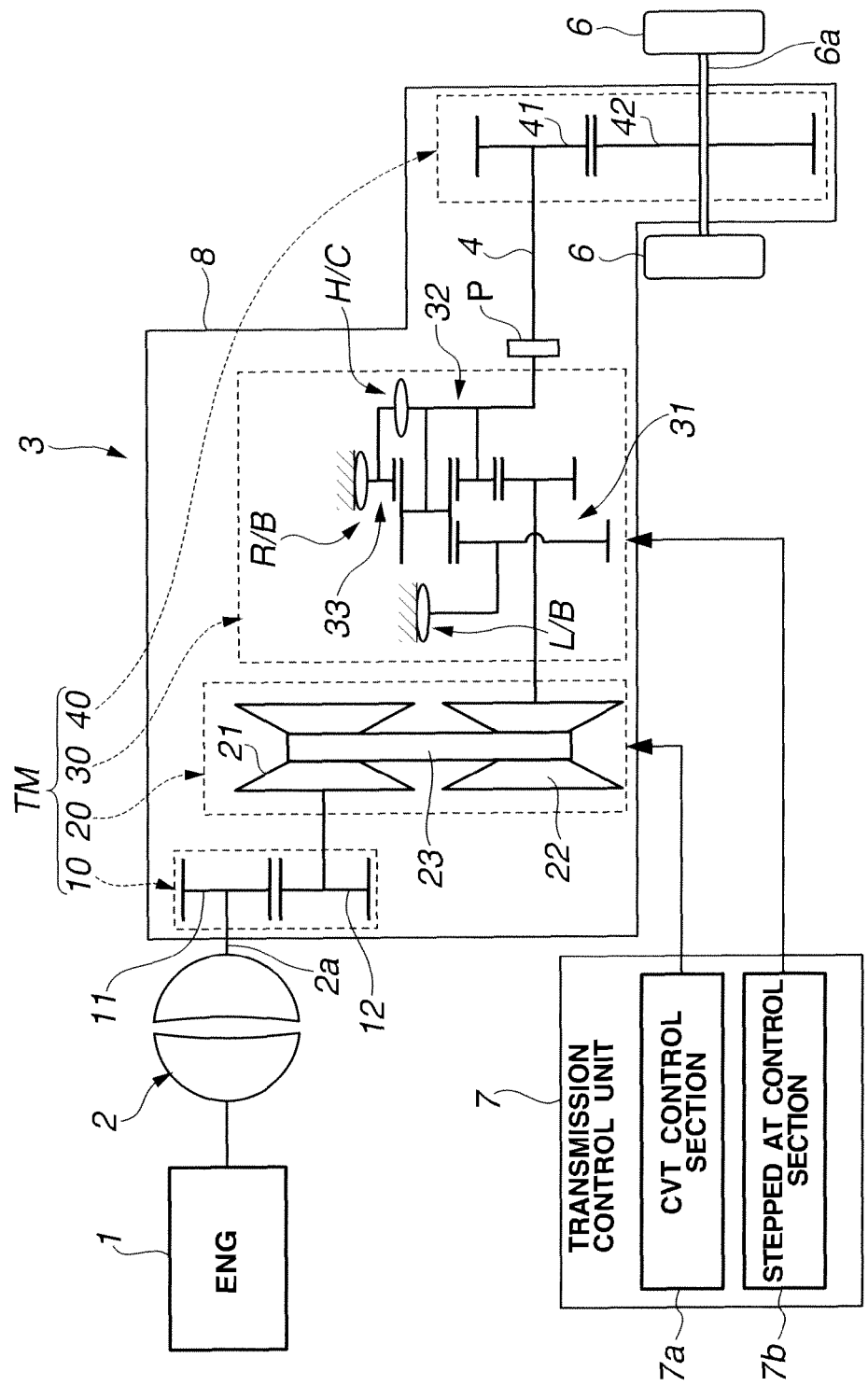
FIG. 1 is a schematic system diagram illustrating a power train, which includes an embodiment of a parking-lock-mechanism equipped automatic transmission.
Figure 2:
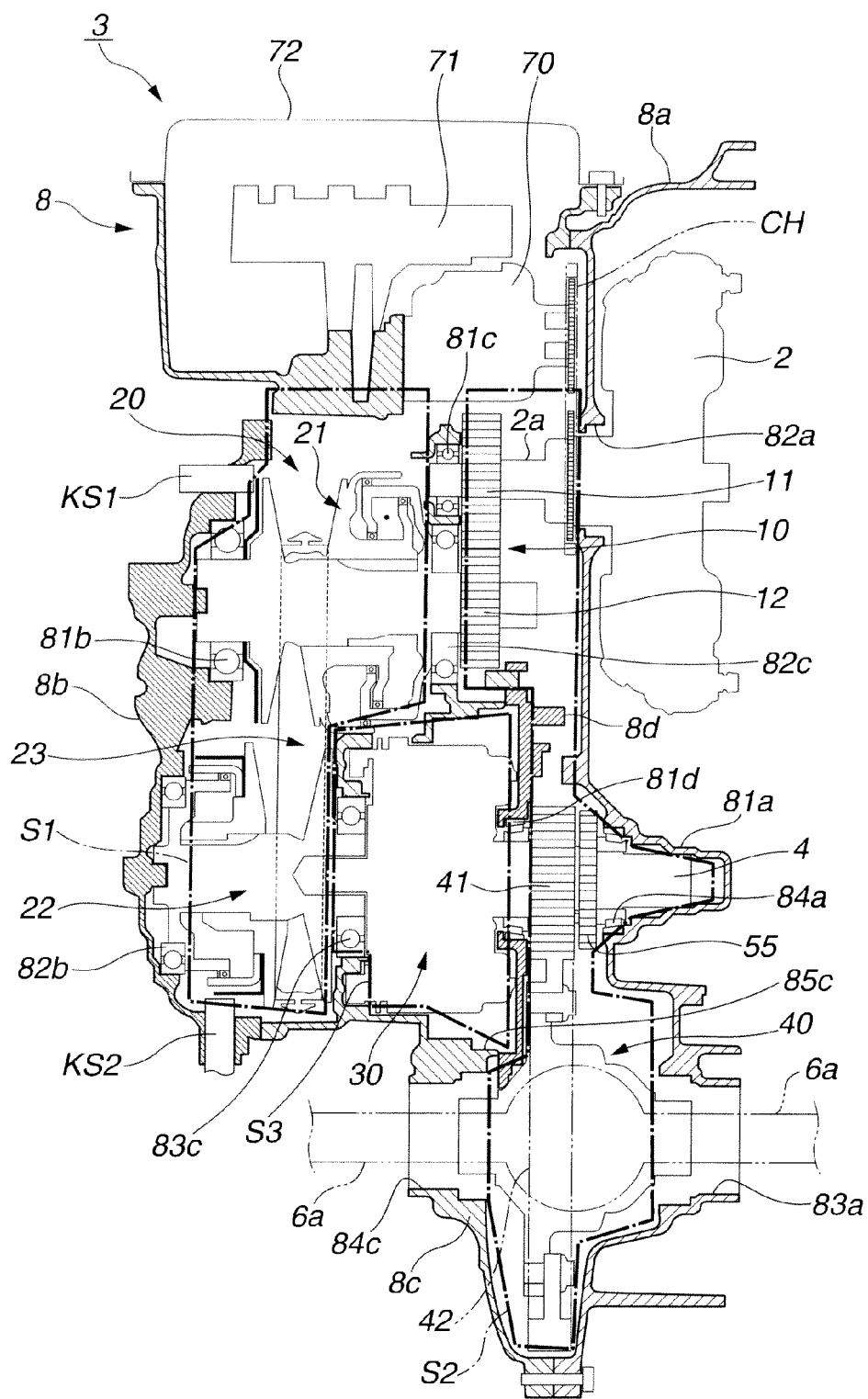
FIG. 2 is a sectional view illustrating the automatic transmission of the embodiment.

Referring now to the drawings, particularly to FIGS. 1-2, the automatic transmission of the embodiment is exemplified in a power train of an automotive vehicle.

As shown in FIG. 1, the power train carries power output from an engine 1 (a source of driving power) to road wheels 6, 6. The power train is comprised of a torque converter 2, an automatic transmission 3, and axle driveshafts 6a, 6a. Automatic transmission 3 has a driven connection with an output shaft 2a of torque converter 2. The power is delivered from automatic transmission 3 via axle driveshafts 6a, 6a to respective road wheels 6, 6. The shifting operation of automatic transmission 3 is controlled by means of a transmission control unit 7. Transmission control unit 7 is comprised of a continuously variable automatic transmission (CVT) control section 7a and a stepped automatic transmission (AT) control section 7b. CVT control section 7a is provided to control the operation of a continuously variable automatic transmission 20 (described later), whereas stepped AT control section 7b is provided to control the operation of a stepped automatic transmission 30 (described later).

As seen from the system diagram of FIG. 1, a Speed-Change System™ and a parking-lock mechanism P are both accommodated in a transmission casing 8 of automatic transmission 3. Parking-lock mechanism P is installed in transmission casing 8, for mechanically locking and unlocking a transmission output shaft 4, which shaft is an output shaft of Speed-Change System™, by engaging and disengaging parking-lock mechanism P with and from the transmission output shaft.

As seen from the sectional view of FIG. 2, transmission casing 8 includes a converter housing (a second casing) 8a, a transmission cover 8b, a transmission case (a first casing) 8c, and a bearing retainer (a bearing retaining wall) 8d.

Converter housing (the second casing) 8a has a recessed portion 81a so that torque converter 2 is fitted onto the inner peripheral wall of recessed portion 81a, and forms a part of the contour of the transmission casing structure on the side of torque converter 2. Converter housing 8a is formed with an input-shaft insertion bore 82a and a drive-shaft insertion bore 83a. When assembling, output shaft 2a of torque converter 2 is inserted into input-shaft insertion bore 82a, whereas one of axle driveshafts 6a, 6a (the right-hand driveshaft 6a, viewing FIG. 2) is associated with drive-shaft insertion bore 83a in such a manner as to protrude from drive-shaft insertion bore 83a. Input-shaft insertion hole 82a is formed in the converter housing 8a substantially at a center of recessed portion 81a. Furthermore, an output-shaft bearing 84a is installed on converter housing 8a to rotatably support one axial portion of transmission output shaft 4.

Transmission cover 8b is contoured so that the internal wall surface of transmission cover 8b covers both the end face (the left-hand end face, viewing FIG. 2) of a primary pulley 21 and the end face (the left-hand end face, viewing FIG. 2) of a secondary pulley 22 of continuously variable automatic transmission 20 (described later), and forms a part of the contour of transmission casing structure on the side of the continuously variable automatic transmission. A primary-pulley bearing 81b and a secondary-pulley bearing 82b are both installed on transmission cover 8b. Primary-pulley bearing 81b is provided to rotatably support primary pulley 21, whereas secondary-pulley bearing 82b is provided to rotatably support secondary pulley 22. A primary-pulley revolution speed sensor KS1 and a secondary-pulley revolution speed sensor KS2 are also installed on transmission cover 8b.

Transmission case (the first casing) 8c is sandwiched between converter housing 8a and transmission cover 8b in such a manner as to form an intermediate partition wall structure by which the internal space of transmission casing 8 can be divided into two spaces. In the shown embodiment, converter housing 8a and transmission case 8c are integrally connected to each other and additionally transmission cover 8b and transmission case 8c are integrally connected to each other, so as to form the contour of transmission casing 8 (i.e., a housing contoured to cover or protect Speed-Change System™). A first transmission area S1 is sectioned by transmission cover 8b and transmission case 8c, so that continuously variable automatic transmission 20 is accommodated in first transmission area S1. A second transmission area S2 is sectioned by converter housing 8a and transmission case 8c, so that parking-lock mechanism P is accommodated in second transmission area S2. An input-shaft bearing 81c, a primary-pulley bearing 82c, and a secondary-pulley bearing 83c are installed on transmission case 8c. Input-shaft bearing 81c is provided to rotatably support the axial end of the output shaft 2a of torque converter 2. Primary-pulley bearing 82c is provided to rotatably support the input shaft of primary pulley 21, whereas secondary-pulley bearing 83c is provided to rotatably support the output shaft of secondary pulley 22. Transmission case 8c is formed with a drive-shaft insertion bore 84c. The other of axle driveshafts 6a, 6a (the left-hand driveshaft 6a, viewing FIG. 2) is associated with drive-shaft insertion bore 84c in such a manner as to protrude from drive-shaft insertion bore 84c. Furthermore, transmission case (the first casing) 8c has a recessed portion 85c, so that stepped automatic transmission 30 is fitted onto the inner peripheral wall of recessed portion 85c. Secondary-pulley bearing 83c is arranged and installed on the transmission case 8c substantially at a center of recessed portion 85c.

Figure 6A:
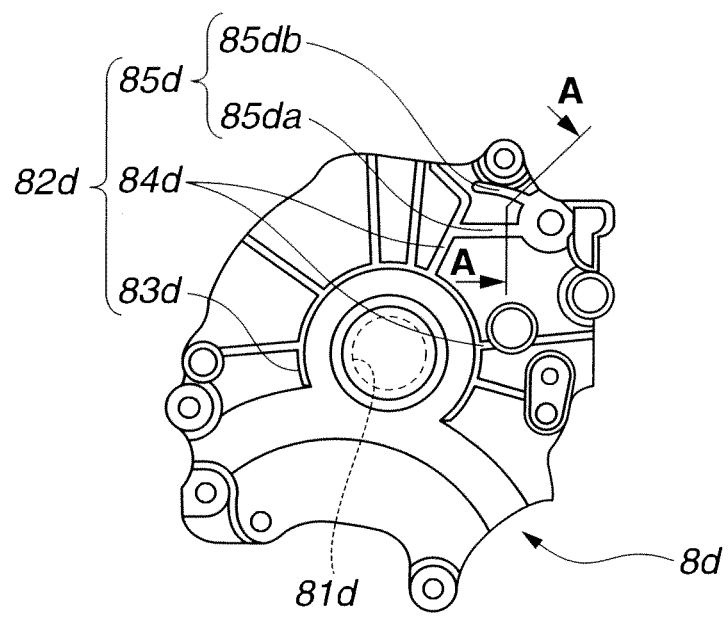
Figure 6B:
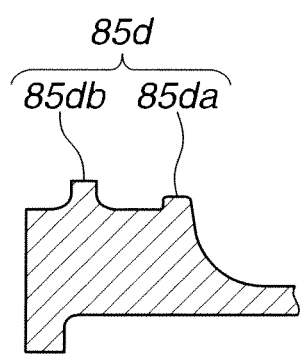
FIG. 6B is a view, partially in cross section, of a ribbed structure of the bearing retainer, taken along the line A-A of FIG. 6A.

Bearing retainer 8d is fixedly connected to or installed on transmission case 8c in such a manner as to cover the recessed portion 85c. The inside of recessed portion 85c is sectioned from the second transmission area S2 by installing bearing retainer 8c on the transmission case 8c. That is, a third transmission area S3 is sectioned by both transmission case 8c and bearing retainer 8d, so that stepped automatic transmission 30 is accommodated in third transmission area S3. As shown in FIGS. 2 and 6A-6B, an output-shaft bearing 81d is installed on bearing retainer 8d to rotatably support another axial portion of transmission output shaft 4, whish shaft has a driven connection with stepped automatic transmission 30. As appreciated from FIGS. 6A-6B, bearing retainer 8d is formed integral with a rib 82d, which is configured to protrude toward the second transmission area S2. In the shown embodiment, rib 82d includes a circumferential rib 83d, a plurality of radial ribs 84d, and a temporary-retaining rib (a protruded portion) 85d. Circumferential rib 83d is configured to extend along the circumference of output-shaft bearing 81d. Radial ribs 84d are configured to radially extend from the circumferential rib 83d, extending along the circumference of output-shaft bearing 81d. Temporary-retaining rib 85d is formed integral with bearing retainer 8d so as to temporarily retain or hold a parking rod 52 (described later) during an assembling work. The plurality of radial ribs 84d are formed on bearing retainer 8d in such a manner as to radially extend from the circumferential rib 83d at arbitrary intervals. Temporary-retaining rib 85d includes (i) a first temporary-retaining rib portion 85da that is provided to temporarily retain and position one lateral portion of parking rod 52 in the transverse direction of parking rod 52 (e.g., a lower portion of parking rod 52), and (ii) a second temporary-retaining rib portion 85db that is provided to temporarily retain and position the opposite lateral portion of parking rod 52 in the transverse direction of parking rod 52 (e.g., an upper portion of parking rod 52).

Hereinafter described is the detailed structure of Speed-Change System™. As clearly shown in FIGS. 1-2, Speed-Change System™ includes a speed-change gear set 10, continuously variable automatic transmission (a main transmission device) 20, stepped automatic transmission (a sub-transmission device) 30, and a final drive gear unit 40.

Speed-change gear set 10 is constructed by a drive gear 11 fixedly connected to the output shaft 2a of torque converter 2 and a driven gear 12 fixedly connected to the input shaft of primary pulley 21 of continuously variable automatic transmission 20. A speed-change gear ratio of speed-change gear set 10 is determined by a gear ratio between drive gear 11 and driven gear 12.

As the continuously variable automatic transmission 20, the existing belt-drive continuously variable automatic transmission is used. Continuously variable automatic transmission 20 is constructed by primary pulley 21, secondary pulley 22, and a belt (e.g., a segmented steel belt) 23 wound on primary and secondary pulleys 21-22. The input shaft of primary pulley 21 is fixedly connected to the driven gear 12 so that power is inputted from speed-change gear set 10 to primary pulley 21. The output shaft of secondary pulley 22 has a driving connection with the input shaft of stepped automatic transmission 30. Hydraulic oil is supplied to a primary-pulley actuation cylinder of primary pulley 21 and also hydraulic oil is supplied to a secondary-pulley actuation cylinder of secondary pulley 22, such that the width of the fixed flange and the movable flange, both constructing primary pulley 21, in other words, the effective diameter of primary pulley 21, can be continuously varied by the hydraulic pressure supplied to the primary-pulley actuation cylinder, and that the width of the fixed flange and the movable flange, both constructing secondary pulley 22, in other words, the effective diameter of secondary pulley 22, can be continuously varied by the hydraulic pressure supplied to the secondary-pulley actuation cylinder. In this manner, a transmission ratio of continuously variable automatic transmission 20 is steplessly variable.

Primary pulley 21 is rotatably supported by primary-pulley bearing 81b installed on transmission cover 8b and primary-pulley bearing 82c installed on transmission case 8c. Secondary pulley 22 is rotatably supported by secondary-pulley bearing 82b installed on transmission cover 8b and secondary-pulley bearing 83c installed on transmission case 8c. As a result, continuously variable automatic transmission 20 is accommodated in the first transmission area S1, which area is sectioned by transmission cover 8b and transmission case 8c.

Stepped automatic transmission 30 includes a so-called Ravigneaux planetary gear system. A compound sun gear 31 of the Ravigneaux planetary gear system serves as an input element by drivingly connecting the secondary pulley 22 of continuously variable automatic transmission 20 to the compound sun gear 31. A carrier 32 of the Ravigneaux planetary gear system serves as an output element by drivingly connecting the carrier 32 to the transmission output shaft 4. Compound sun gear 31 is configured to be fixed to transmission casing 8 by means of a low brake (a first-speed gear selection brake) L/B, so that compound sun gear 31 is held stationary. Carrier 32 is configured to be drivingly connected to a ring gear 33 of the Ravigneaux planetary gear system by means of a high clutch (a second-speed gear selection clutch) H/C. Ring gear 33 is configured to be fixed to transmission casing 8 by means of a reverse brake R/B, so that ring gear 33 is held stationary.

In the stepped automatic transmission 30, the operation (application/release) of each of low brake L/B, high clutch H/C, and reverse brake R/B can be controlled depending on the sullied hydraulic pressure, in such a manner as to achieve a selected one of a forward first-speed gear, a forward second-speed gear, and a reverse first-speed gear. In the case of the forward first-speed gear, only the low brake L/B is applied. In the case of the forward second-speed gear, only the high clutch H/C is applied. On the other hand, in the case of the reverse first-speed gear, only the reverse brake R/B is applied. The following TABLE 1 shows the relationship between the operating conditions of the clutch (i.e., high clutch H/C) and the two band brakes (i.e., low brake L/B and reverse brake R/B) and the selected gear of stepped automatic transmission 30. In the TABLE 1, the character "O" indicates an applied state, whereas the character "X" indicates a released state.

TABLE 1

| GEAR | L/B | H/C | R/B |
| --- | --- | --- | --- |
| FORWARD FIRST | O | X | X |
| FORWARD SECOND | X | O | X |
| REVERSE FIRST | X | X | O |

When shifting operation is performed by stepped automatic transmission 30, cooperative control between the controls of continuously variable automatic transmission 20 and stepped automatic transmission 30 is executed, so as to suppress undesirable shift shock.

Furthermore, the input shaft of stepped automatic transmission 30 is drivingly connected to secondary pulley 22, rotatably supported by secondary-pulley bearing 83c installed on transmission case 8c. On the other hand, the output shaft of stepped automatic transmission 30 is drivingly connected to transmission output shaft 4, rotatably supported by output-shaft bearing 81d installed on bearing retainer 8d. As a result, stepped automatic transmission 30 is accommodated in the third transmission area S3, which area is sectioned by transmission case 8c and bearing retainer 8d.

Final drive gear unit 40 is constructed by a drive gear 41 and a driven gear 42. Drive gear 41 is installed on transmission output shaft 4, which shaft is configured to protrude from bearing retainer 8d toward the side of converter housing 8a. Driven gear 42 is drivingly connected to the axle driveshafts 6a, 6a associated with the respective road wheels 6, 6. A speed reduction ratio of final drive gear unit 40 is determined by a gear ratio between drive gear 41 and driven gear 42. Drive gear 41 and driven gear 42, constructing final drive gear unit 40, are arranged between converter housing 8a and transmission case 8c, and thus final drive gear unit 40 is accommodated in the second transmission area S2.

Figure 3A:
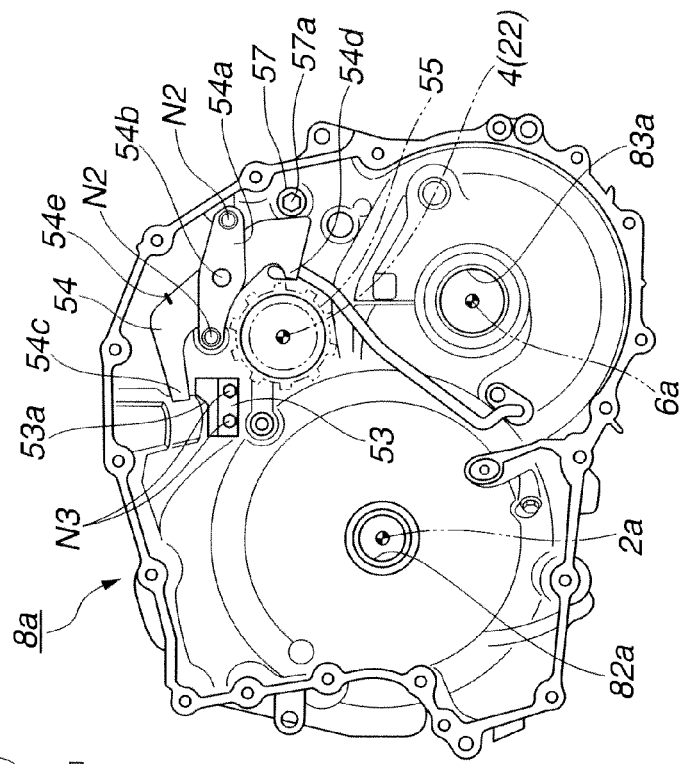
Figure 3B:
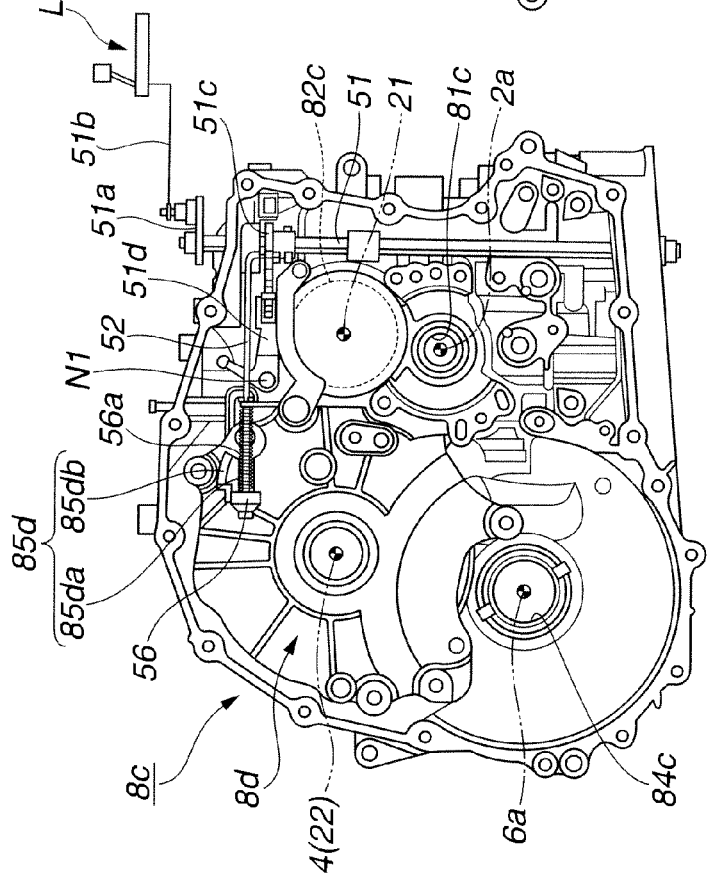
FIG. 3B is a plan view illustrating the inside of a converter housing of the automatic transmission of the embodiment.
Figure 4:
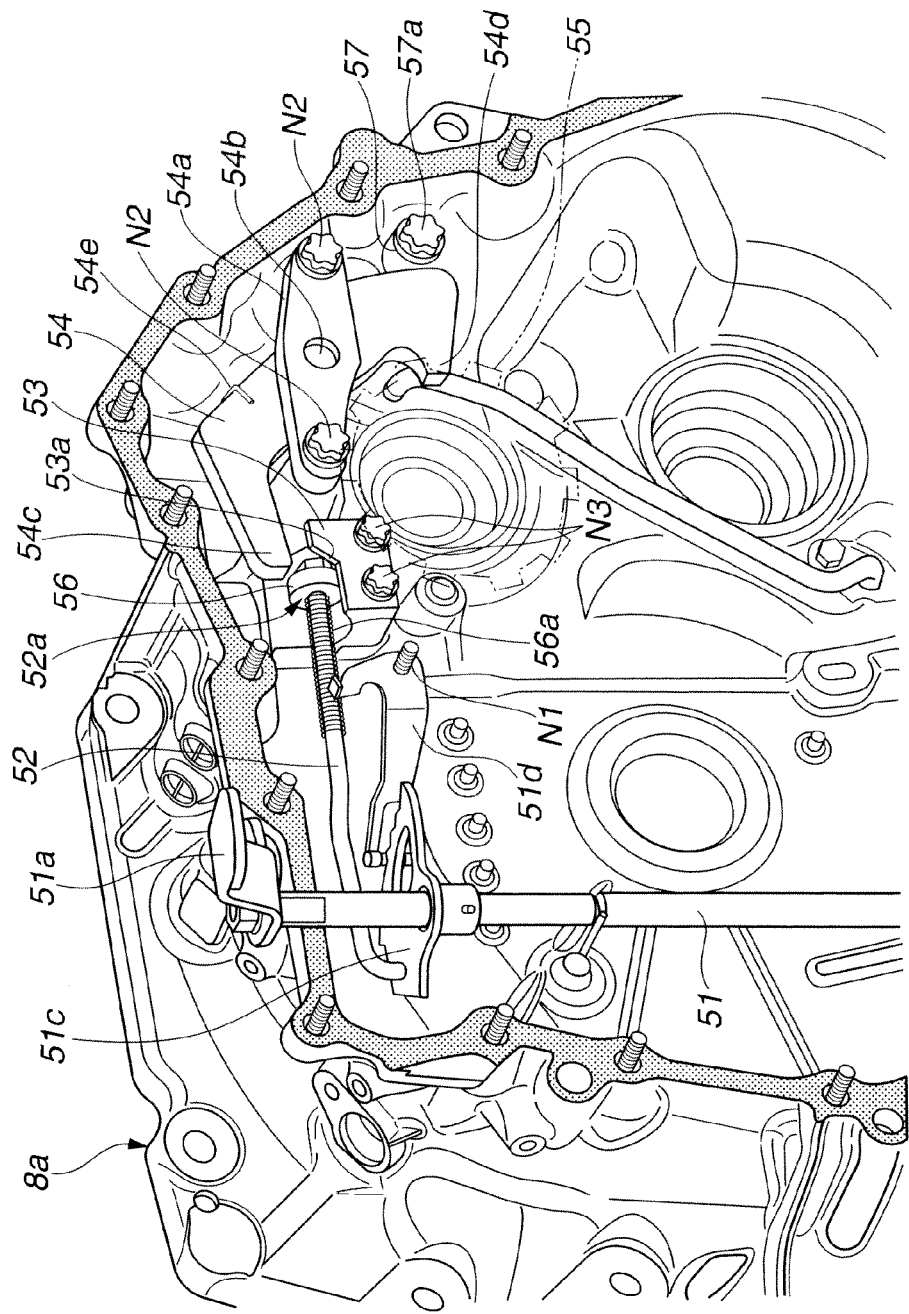
FIG. 4 is a perspective view illustrating a parking-lock mechanism of the automatic transmission of the embodiment.

Hereinafter described is the detailed structure of parking-lock mechanism P. As best seen in FIGS. 3A-3B, and 4, parking-lock mechanism P includes a manual shaft 51, a parking-pawl-actuator rod (usually, abbreviated to "parking rod") 52, a support actuator 53, a parking pawl 54, and a parking-lock gear (simply, a parking gear) 55.

As shown in FIG. 3A, manual shaft 51 is rotatably installed on transmission case 8c such that manual shaft 51 extends in the vertical direction of transmission case 8c, and that the upper end of manual shaft 51 partly protrudes outside of transmission case 8c. A parking plate 51a is attached to the upper end of manual shaft 51. Parking plate 51a is also linked to a motion-transmission linkage 51b. That is, the upper end of manual shaft 51 is mechanically linked through parking plate 51a and motion-transmission linkage 51b to a shift lever L, such that manual shaft 51 can be rotated in synchronism with a driver's shift-lever operation.

As best seen in FIG. 3A, parking rod 52 is arranged such that the longitudinally-extending major part (the main rod portion) of parking rod 52 extends in a direction perpendicular to the axial direction of manual shaft 51 and perpendicular to the axial direction of transmission output shaft 4. As shown in FIGS. 3A and 4, one end (a bent end portion) of parking rod 52 is linked to a detent plate (or a detent lever) 51c fixedly connected to manual shaft 51, such that rotary motion of manual shaft 51 is converted into a longitudinal displacement of parking rod 52 via detent plate 51c.

A detent-roller-and-spring assembly (simply, a detent spring) 51d is installed on transmission case 8c by means of an attaching bolt N1. Detent plate 51c has a toothed portion partly formed on its outer periphery and configured by a plurality of recesses (tooth spaces) and projections. Each of the peripheral recesses of detent plate 51c is configured to be engaged with or disengaged from the roller of detent-roller-and-spring assembly 51d. There is a one-to-one correspondence between the plurality of detent positions, corresponding to the respective recesses, and the shift-lever positions of shift lever L. That is, the actually-engaged detent position (the actually-engaged recess of detent plate 51c actually engaged with the roller of detent-roller-and-spring assembly 51d) is determined depending on the selected shift-lever position.

Furthermore, as shown in FIG. 4, a substantially conical-nosed cylindrical-hollow cam 56 is slidably fitted onto the other rod end (the tip) 52a of parking rod 52. Cam 56 is shaped at its tip into a frusto-conical shape whose diameter gradually decreasing toward the top face. Cam 56 is permanently forced toward the tip 52a of parking rod 52 by a spring 56a. Spring 56a is a compression coil spring, which is interleaved, under preload, between the bottom face of cam 56 and a parking-rod spring-retainer (not shown), put in place near the intermediate two-step bent portion of parking rod 52. Although it is not clearly shown in the drawings, in order to prevent cam 56 from slipping through the tip 52a of parking rod 52, the rightmost movement (viewing FIG. 4) of cam 56 is restricted by means of a fastener attached to the tip of parking rod 52.

Figure 5:
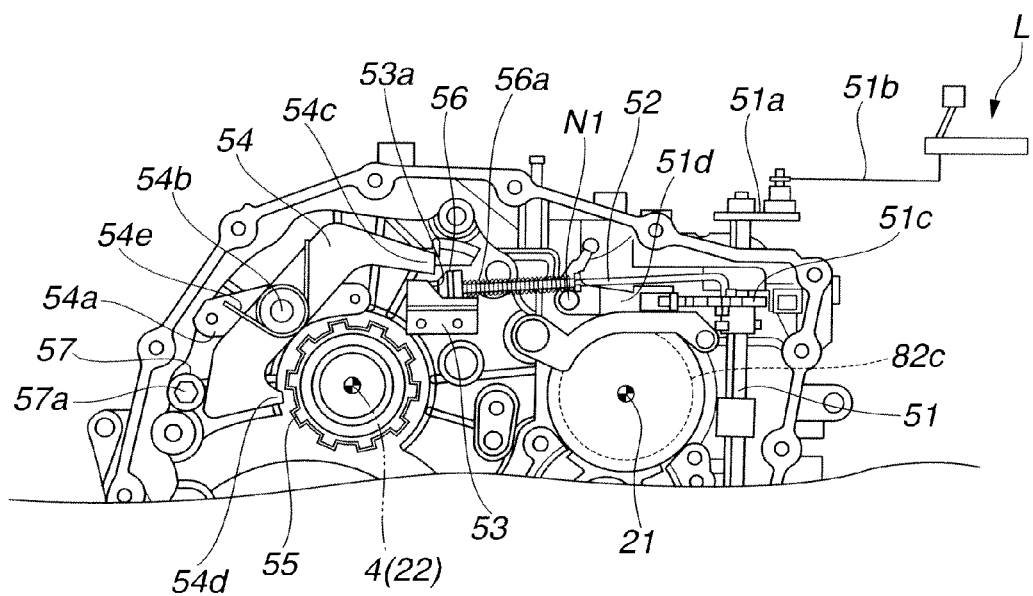
FIG. 5 is an explanatory view illustrating an initial state of the parking-lock mechanism, in other words, an unlocked state wherein a parking pawl of the parking-lock mechanism of the automatic transmission of the embodiment is released from a parking-lock gear.

As appreciated from the perspective view of parking-lock mechanism P of FIG. 4 and the initial state of parking-lock mechanism P of FIG. 5, support actuator 53 has a guide face for supporting and guiding the cam 56. The guide face of support actuator 53 contains a sloped face 53a onto which cam 56, attached to the tip 52a of parking rod 52, runs when a specified longitudinal displacement of parking rod 52 has been reached. As shown in FIGS. 3B and 4, support actuator 53 is installed on converter housing 8a by means of attaching bolts N3, N3.

As shown in FIG. 3B, parking pawl 54 is arranged above parking gear 55 in such a manner as to circumferentially extend along the outer peripheral surface of parking gear 55. As seen in FIGS. 3R and 4, parking pawl 54 is arranged in a space defined between converter housing 8a and a retainer plate 54a, which plate is installed on converter housing 8a by means of two attaching bolts N2, N2, such that a central pivot 54b, integrally connected to or formed integral with the central portion of parking pawl 54, is pivotably linked to the center of retainer plate 54a. As best seen in FIG. 4, parking pawl 54 is formed at one end with a cam-follower portion 54c, which is brought into cam-connection with cam 56, when the specified longitudinal displacement of parking rod 52 has been reached. As best seen in FIG. 3B, parking pawl 54 is formed at the other end with a pawl 54d, which is engageable with or disengageable from parking gear 55. As can be seen in FIGS. 3B and 4-5, the cam-operated parking pawl 54 is permanently forced by means of a return spring 54e in an anti-clockwise direction (viewing FIG. 3B) that pawl 54d is disengaged from parking gear 55.

As seen in FIGS. 3B and 4-5, a stopper 57 is installed on converter housing 8a by means of a bolt (a fastening device) 57a. Stopper 57 is made of an annular steel plate. The initial position of parking pawl 54 (in other words, the initial attitude of parking pawl 54 without pivotal force applied through cam 56 to cam-follower portion 54c of parking pawl 54 against the spring force of return spring 54e), is restricted depending on the outside diameter of the annular stopper 57 (see FIG. 3B). More concretely, the anticlockwise rotary motion of parking pawl 54 is restricted by abutment between the backface of pawl 54d and the circumference of stopper 57. At the initial position shown in FIG. 5, the initial attitude of parking pawl 54 is held in a state where a slight clearance space exists between support actuator 53 and cam-follower portion 54c.

The smaller the outside diameter of stopper 57, the greater the amount of pivotal motion of parking pawl 54 (in other words, the longer the distance between pawl 54d and parking gear 55), during a ratchet action by which parking gear 55 is disengaging from parking pawl 54 when a change of the shift-lever position is occurring, for instance, when the shift-lever position is shifting from a P (parking) range to a D (drive) range. Conversely, the greater the outside diameter of stopper 57, the smaller the amount of pivotal motion of parking pawl 54 (in other words, the shorter the distance between pawl 54d and parking gear 55), during a ratchet action.

As clearly shown in FIG. 2, parking gear 55 is fixedly connected to a shaft section of transmission output shaft 4, axially protruded from bearing retainer 8d, such that parking gear 55 is arranged between drive gear 41 of final drive gear unit 40 and converter housing 8a.

Briefly, parking-lock mechanism P operates as follows.

When the shift-lever position of shift lever L is moved toward a P (parking) range by the driver, rotary motion of manual shaft 51 occurs, and thus a longitudinal displacement of parking rod 52 occurs. As soon as the specified longitudinal displacement of parking rod 52 has been reached, cam 56 runs onto the sloped face 53a of support actuator 53, and then gets into the space defined between the sloped face 53a of support actuator 53 and the underside of cam-follower portion 54c of parking pawl 54. Thus, cam-follower portion 54c is pushed by cam 56, and therefore pivotal motion of parking pawl 54 about central pivot 54b against the spring force of return spring 54e occurs. As a result, pawl 54d is brought into meshed-engagement with parking gear 55 so that transmission output shaft 4 is locked.

In the case of parking-lock mechanism P of the embodiment, parking gear 55 is arranged between converter housing 8a and bearing retainer 8d (see FIG. 2), manual shaft 51 and parking rod 52 are supported by transmission case 8c (see FIG. 3A), and support actuator 53 and parking pawl 54 are installed on converter housing 8a (see FIG. 3B). Thus, parking-lock mechanism P is arranged in the second transmission area S2, which area is sectioned by converter housing 8a and transmission case 8c.

Returning to FIG. 2, reference sign 70 denotes an oil pump, reference sign 71 denotes a valve control unit, and reference sign 72 denotes an oil pan. Also, oil pump 70 has a driven connection with the output shaft 2a of torque converter 2 through a chain CH, such that oil pump 70 is driven by rotation of torque-converter output shaft 2a.

The operation of the automatic transmission of the embodiment is hereunder described in detail, while dividing the details of the operation into two items, namely, [LOAD-CONCENTRATION PREVENTING ACTION] and [ASSEMBLY-WORK EFFICIENCY ENHANCING ACTION].

[LOAD-CONCENTRATION PREVENTING ACTION]

When a P (parking) range is selected by shift lever L in the automatic transmission 3 of the embodiment, rotary motion of manual shaft 51 occurs. The rotary motion of manual shaft 51 causes parking rod 52 to displace in its longitudinal direction. As a result of this, the pawl 54*d* of parking pawl 54 is brought into meshed-engagement with parking gear 55, and hence transmission output shaft 4 is locked and thus the axle driveshafts 6*a*, 6*a* and road wheels 6, 6 are locked.

At this time, transmission output shaft 4 is going to rotate, but rotary motion of transmission output shaft 4 is prevented by meshed-engagement between parking pawl 54 and parking gear 55. Hence, with transmission output shaft 4 locked, a reaction force from transmission output shaft 4 acts on each of parking pawl 54, parking rod 52 whose tip is kept in cam-connection with the cam-follower portion 54*c* of parking pawl 54, and support actuator 53 having the sloped face 53*a* onto which cam 56 of parking rod 52 runs.

In the case of parking-lock mechanism P of the embodiment, parking pawl 54 is arranged in a space defined between converter housing 8*a* and retainer plate 54*a*, which plate is installed on converter housing 8*a* by means of two attaching bolts N2, N2 (see FIG. 3B). Support actuator 53 is installed on converter housing 8*a* by means of attaching bolts N3, N3 (see FIG. 3B). On the other hand, parking rod 52 is linked to the detent plate (the detent lever) 51*c* fixedly connected to manual shaft 51, which shaft is rotatably installed on transmission case 8*c* (see FIG. 3A).

For the reasons discussed above, the reaction force acting on parking pawl 54 and the reaction force acting on support actuator 53 can be supported by converter housing 8*a*, whereas the reaction force acting on parking rod 52 and the reaction force acting on manual haft 51 can be supported by transmission case 8*c*.

As a result, in the parking range, the reaction force from transmission output shaft 4 can be decentralizedly supported by converter housing 8*a* and transmission case 8*c* both constructing major parts of transmission casing 8. Thus, it is possible to prevent high localized loads from being concentrated on a part of transmission casing 8. This eliminates the necessity of enhancing a mechanical strength of a part of transmission casing 8. Thus, it is possible to reliably support the reaction force from transmission output shaft 4 without any layout/design change in the internal structure of the transmission casing and without any transmission-case shape change.

[ASSEMBLY-WORK EFFICIENCY ENHANCING ACTION]

In assembling automatic transmission 3 of the embodiment, as can be appreciated from FIG. 2, first of all, continuously variable automatic transmission 20 is assembled such that the axis of the pulley shaft of primary pulley 21 and the axis of the pulley shaft of secondary pulley 22 are put up vertically with respect to transmission cover 8*b*.

Next, transmission case 8*c* is integrally connected to transmission cover 8*b* in such a manner as to cover continuously variable automatic transmission 20, and whereby the first transmission area S1 is sectioned. Then, under the condition where the axes of primary and secondary pulleys 21-22 are put up vertically, stepped automatic transmission 30 is assembled and installed on transmission case 8*c*. At this time, oil pump 70 and valve control unit 71 are installed on transmission case 8*c*.

Thereafter, bearing retainer 8*d* is integrally connected to transmission case 8*c* in such a manner as to cover stepped automatic transmission 30, and whereby the third transmission area S3 is sectioned. Then, under the condition where the axes of primary and secondary pulleys 21-22 are put up vertically, transmission output shaft 4 and speed-change gear set 10 are assembled and installed. Hereupon, before installing transmission output shaft 4, drive gear 41 of final drive gear unit 40 and parking gear 55 are both pre-installed on transmission output shaft 4.

Thereafter, converter housing 8*a* is integrally connected to transmission case 8*c* in such a manner as to cover transmission output shaft 4 and speed-change gear set 10, so as to form the contour of transmission casing 8 (i.e., a housing contoured to cover or protect Speed-Change System™). In this manner, the assembly work of automatic transmission 3 terminates.

Regarding assembly work of internal linkages constructing parking-lock mechanism P and accommodated in transmission casing 8, the assembly work of these internal linkages of parking-lock mechanism P starts under a specified condition where manual shaft 51 has been penetrated through and rotatably installed on transmission case 8*c* after transmission output shaft 4 has been installed. Under the specified condition, detent plate 51*c* is fixedly connected to manual shaft 51 by means of a fastening device, such as a locknut and a retaining pin. Hereupon, before installing detent plate 51*c* on manual shaft 51, the bent end of parking rod 52 is integrally connected to and pre-installed on detent plate 51*c*. Hence, at the same time, manual shaft 51 and parking rod 52 are installed on transmission case 8*c*. At this time, parking rod 52 becomes located or mounted on bearing retainer 8*d*, and temporarily retained by temporary-retaining rib 85*d* formed integral with bearing retainer 8*d*.

That is to say, parking rod 52 (exactly, cam 56 attached to the tip of parking rod 52) can be temporarily retained such that a first lateral portion of cam 56 of parking rod 52 in the transverse direction of parking rod 52 (e.g., a lower portion of cam 56, facing parking gear 55) is positioned by way of abutment between the first lateral portion of cam 56 and the first temporary-retaining rib portion 85*da* and that a second lateral portion of cam 56 of parking rod 52 in the transverse direction of parking rod 52 (e.g., an upper portion of cam 56, facing parking pawl 54) is positioned by way of abutment between the second lateral portion of cam 56 and the second temporary-retaining rib portion 85*db*. Consequently, parking rod 52 (exactly, cam 56 attached to the tip of parking rod 52) can be temporarily retained between the first temporary-retaining rib portion 85*da* and the second temporary-retaining rib portion 85*db*, when assembling.

Additionally, the detent-roller-and-spring assembly (simply, the detent spring) 51*d* is installed on transmission case 8*c* by means of attaching bolt N1.

Before integrally connecting converter housing 8*a* to transmission case 8*c*, support actuator 53 is preinstalled on converter housing 8*a* by means of attaching bolts N3, N3, and the central pivot 54*b* of parking pawl 54 is pivotably installed on the center of retainer plate 54*a*, which plate is installed on converter housing 8*a* by means of two attaching bolts N2, N2. Furthermore, stopper 57 is installed on converter housing 8*a* by means of bolt 57*a*.

Then, converter housing 8*a* is fixedly connected to converter case 8*c*, while mutually positioning the parking rod 52, support actuator 53, and parking pawl 54 such that the tip (the cam-equipped end) of parking rod 52, which rod is installed on transmission case 8*c*, enters or squeezes between support actuator 53 and parking pawl 54, both installed on converter housing 8*a*.

At this time, parking rod 52, support actuator 53, and parking pawl 54 are all covered with converter housing 8*a*. Thus, it is very difficult to confirm the relationship among positions of these three members 52-54 by visual observation.

According to the transmission casing structure of the parking-lock-mechanism equipped automatic transmission of the embodiment, cam 56 of parking rod 52 can be temporarily retained between the first temporary-retaining rib portion 85*da* and the second temporary-retaining rib portion 85*db*. Thus, when installing converter housing 8*a* on transmission case 8*c*, there are less deviations of the internal linkages, especially, parking rod 52, support actuator 53, and parking pawl 54, from their desired installation positions.

Therefore, even in the presence of the difficulty of confirming the relationship among positions of these three members 52-54 by visual observation, the provision of the first and second temporary-retaining rib portions 85*da*-85*db* ensures easy and accurate positioning among parking rod 52, support actuator 53, and parking pawl 54.

Moreover, in automatic transmission 3 of the embodiment, the internal space of transmission casing 8 is sectioned into three sections, namely, (i) the first transmission area S1 in which continuously variable automatic transmission (serving as the main transmission device) 20 is accommodated, (ii) the second transmission area S2 in which parking-lock mechanism P is accommodated, and (iii) the third transmission area S3 in which stepped automatic transmission (serving as the sub-transmission device) 30 is accommodated.

Hence, it is possible to easily cope with a design change of temporary-retaining rib 85*d* without any shape change of transmission case 8*c*. Thus, it is possible to easily cope with a shape change of cam 56 or another type of cam (having a cam shape differing from cam 56 shown in FIGS. 3A and 4-5.

Additionally, in automatic transmission 3 of the embodiment, stepped automatic transmission 30 is further installed or laid out between continuously variable automatic transmission 20 and transmission output shaft 4. This enables decreased outside diameters of primary and secondary pulleys 21-22 (that is, lightening and downsizing of continuously variable automatic transmission 20), and a wider applicable gear ratio range (a wider ratio coverage) of Speed-Change System™. As a result of this, it is possible to reconcile two contradictory requirements, that is, improved fuel economy and superior accelerating ability from standstill of the automotive vehicle.

Furthermore, in automatic transmission 3 of the embodiment, temporary-retaining rib 85*d* includes (i) a first temporary-retaining rib portion 85*da* that is provided to temporarily retain one lateral portion of parking rod 52 in the transverse direction of parking rod 52 (e.g., a lower portion of parking rod 52), and (ii) a second temporary-retaining rib portion 85*db* that is provided to temporarily retain the opposite lateral portion of parking rod 52 in the transverse direction of parking rod 52 (e.g., an upper portion of parking rod 52). Cam 56 of parking rod 52 can be temporarily retained between the first temporary-retaining rib portion 85*da* and the second temporary-retaining rib portion 85*db*, when assembling.

As a result of this, it is possible to enhance temporary-retaining ability of the internal linkages (especially, parking rod 52) of parking-lock mechanism P. Hence, it is possible to more effectively prevent a deviation of parking rod 52 from its desired installation position, when integrally connecting converter housing 8*a* to transmission case 8*c*.

Additionally, in automatic transmission 3 of the embodiment, the initial position of parking pawl 54 (in other words, the initial attitude of parking pawl 54 without pivotal force applied through cam 56 to cam-follower portion 54*c* of parking pawl 54 against the spring force of return spring 54*e*) is restricted by means of stopper 57 installed on converter housing 8*a*, such that, at the initial position, cam-follower portion 54*c* of parking pawl 54 is kept out of abutted-engagement with support actuator 53.

Therefore, even when parking pawl 54 moves out of mesh with parking gear 55 during a ratchet action with parking gear 55 disengaging from parking pawl 54 when a change of the shift-lever position is occurring, for instance, when the shift-lever position is shifting from a P (parking) range to a D (drive) range and thus parking pawl 54 returns to its initial position, parking pawl 54 never abuts on support actuator 53.

Therefore, there is no necessity of a parking-pawl receiving face to be formed on support actuator 53. Thus, the shape and dimensions of support actuator 53 can be generally simplified and downsized. This also contributes to downsizing of attaching bolts N3, N3 used to install support actuator 53 on converter housing 8*a*.

Furthermore, in automatic transmission 3 of the embodiment, stopper 57 is provided as a separate component part separated from converter housing 8*a* constructing a part of transmission casing 8, and thus installed on or integrally connected to converter housing 8*a* by means of bolt 57*a*. That is, stopper 57 is integrally connected to converter housing 8*a*, but not formed integral with converter housing 8*a* in a manner so as to protrude from the inner peripheral wall of converter housing 8*a*.

For the reasons discussed above, even when parking pawl 54 is brought into abutted-engagement with stopper 57 during a ratchet action, there is no noise knocking on converter housing 8*a* directly with parking pawl 54, thus effectively suppressing collision noise.

Suppose, for example, that converter housing 8*a* is formed by aluminum alloy casting, and a parking-pawl stopper is formed integral with converter housing 8*a*. There is a possibility that very small fragments arise from the collapse or breakdown of the integrally-formed aluminum-alloy stopper due to impact (collision between the parking-pawl stopper and parking pawl 54) produced during repeated ratchet actions. Hence, there is a possibility that transmission-casing contaminants are caused by the above-mentioned fragments.

In contrast, in automatic transmission 3 of the embodiment, stopper 57 is provided as a separate component part separated from converter housing 8*a*, and thus it is possible to inexpensively enhance the mechanical strength of stopper 57, and also to inexpensively suppress the occurrence of transmission-casing contaminants.

Moreover, in automatic transmission 3 of the embodiment, the distance between pawl 54*d* of parking pawl 54 and parking gear 55 at the initial position of parking pawl 54, can be set or determined depending on the outside diameter of stopper 57. This distance between parking pawl 54 and parking gear 55 greatly correlates with the rotational speed of parking pawl 54 when parking pawl 54 moves into mesh with parking gear 55. The longer the distance between parking pawl 54 and parking gear 55, the faster the rotational speed of parking pawl 54. The shorter the distance between parking pawl 54 and parking gear 55, the slower the rotational speed of parking pawl 54.

Therefore, it is possible to easily set the rotational speed of parking pawl 54 when parking pawl 54 moves into mesh with parking gear 55, by adjusting the outside diameter of stopper 57, thereby ensuring the ease in changing a set value of the rotational speed of parking pawl 54.

Additionally, in automatic transmission 3 of the embodiment, parking-lock mechanism P is configured such that the backface of pawl 54*d* of parking pawl 54 is kept in abutted-engagement with the circumference of the annular stopper 57 at the initial position of parking pawl 54. Hereupon, the shape of pawl 54d is configured to ensure or have enough strength to endure for applied stresses produced every meshing actions between parking pawl 54 and parking gear 55 without breaking.

Therefore, it is possible to receive impact, produced by collision-contact between parking pawl 54 and stopper 57 during repeated ratchet actions, mainly by the backface of pawl 54d having the sufficient strength. Thus, it is possible to reduce the magnitude of the impact force applied to the intermediate portion of parking pawl 54 (containing the central pivot 54b), thereby ensuring a properly lowered strength of the parking-pawl intermediate portion. This contributes to downsizing of parking pawl 54 (in other words, downsizing of overall parking-lock system), thus ensuring smaller space requirements of overall parking-lock system and lower parking-lock system costs.

Automatic transmission 3 of the embodiment can provide the following effects.

(1) In an automatic transmission 3 that accommodates a parking-lock mechanism P in a transmission casing 8, for mechanically locking and unlocking a transmission output shaft 4 of a Speed-Change System™ by engaging and disengaging the parking-lock mechanism P with and from the transmission output shaft 4, the transmission casing 8 includes a first casing (a transmission case 8c) and a second casing (a converter housing 8a) integrally connected to each other to form a housing configured to cover the Speed-Change System™. The parking-lock mechanism P includes a manual shaft 51 configured to rotate in synchronism with a driver's shift-lever operation, a parking rod 52 whose longitudinal displacement is produced by rotary motion of the manual shaft 51, a support actuator 53 onto which a cam 56, attached to a tip 52a of the parking rod 52 runs when a specified longitudinal displacement of the parking rod 52 has been reached, and a parking pawl 54 configured to be pushed and moved by the cam 56 when the cam 56 has run onto the support actuator 53 owing to the specified longitudinal displacement of the parking rod 52 so that the parking pawl 54 is brought into meshed-engagement with a parking gear 55 installed on the transmission output shaft 4. The manual shaft 51 and the parking rod 52 are installed on the first casing (transmission case 8c), whereas the support actuator 53 and the parking pawl 54 are installed on the second casing (converter housing 8a). A temporary-retaining structure (a temporary-retaining rib) 85d is provided on a face of the first casing (transmission case 8c) facing the second casing (converter housing 8a), for temporarily retaining the parking rod 52.

Therefore, according to automatic transmission 3 of the embodiment, it is possible to ensure decentralization of loads (reaction forces) acting on transmission casing 8 in a parking range, thus preventing load concentration on a part of transmission casing 8, and also to greatly facilitate the assembly work of the parking-lock-mechanism equipped automatic transmission.

(2) The Speed-Change System™ includes a main transmission device (a continuously variable automatic transmission) 20 and a sub-transmission device (a stepped automatic transmission) 30. An internal space of the transmission casing 3 is sectioned into three sections, namely, (i) a first transmission area S1 configured to accommodate the main transmission device 20, (ii) a second transmission area S2 configured to accommodate the parking-lock mechanism P, and (iii) a third transmission area S3 configured to accommodate the sub-transmission device 30. The temporary-retaining structure (the temporary-retaining rib) 85d is provided on a bearing retaining wall (a bearing retainer) 8d through which the second transmission area S2 and the third transmission area S3 are sectioned from each other and which is configured to support the transmission output shaft 4.

Therefore, it is possible to easily cope with a design change of the temporary-retaining structure (the temporary-retaining rib) 85d without any shape change of transmission case 8c, and thus it is possible to easily cope with a shape change of cam 56 or another type of cam (having a cam shape differing from cam 56 shown in the drawings.

(3) The temporary-retaining structure (the temporary-retaining rib) 85d includes a first temporary-retaining rib portion 85da provided to temporarily retain and position one lateral portion of parking rod 52 in the transverse direction of parking rod 52 (e.g., a lower portion of parking rod 52), and a second temporary-retaining rib portion 85db provided to temporarily retain and position the opposite lateral portion of parking rod 52 in the transverse direction of parking rod 52 (e.g., an upper portion of parking rod 52).

Therefore, it is possible to insure enhanced temporary-retaining ability for parking rod 52 when assembling, and thus it is possible to more effectively prevent a deviation of parking rod 52 from its desired installation position, when assembling or installing the converter housing 8a on the transmission case 8c.

In the shown embodiment, as a temporary-retaining structure (temporary retaining means) for temporarily retaining the cam 56 attached to the tip 52a of parking rod 52, temporary-retaining rib 85d is integrally formed on the bearing retainer 8d. In addition to temporary-retaining rib 85d integrally formed on bearing retainer 8d, a recessed structure may be further configured or provided on a portion of converter housing 8a, facing the temporary-retaining rib 85d of bearing retainer 8d, so that cam 56 as well as the tip of parking rod 52 can be partly accommodated or guided or retained in the recessed structure of converter housing 8a. In such a case, when transmission case 8c and converter housing 8a are integrally connected to each other, parking rod 52 is partly surrounded by means of both the recessed structure of converter housing 8a and temporary-retaining rib 85d of bearing retainer 8d. Thus, when a longitudinal displacement of parking rod 52 occurs due to movement of shift lever L toward a P (parking) range, the longitudinal displacement of parking rod 52 can be accurately guided by means of the recessed structure of converter housing 8a as well as temporary-retaining rib 85d of bearing retainer 8d. Hence, parking rod 52 can be reliably guided and displaced without deviating the parking rod 52 from the support actuator 53, thus ensuring stable pushing action of cam 56 of parking rod 52 on cam-follower portion 54c of parking pawl 54.

Also, in automatic transmission 3 of the embodiment, as a temporary-retaining structure (temporary retaining means) for temporarily retaining the parking rod 52, a ribbed structure (i.e., temporary-retaining rib 85d), integrally formed on bearing retainer 8d and configured to protrude from the face of bearing retainer 8d toward the second transmission area S2, is used. Instead of using the ribbed structure (temporary-retaining rib 85d), a recessed structure may be formed in bearing retainer 8d so that cam 56 as well as the tip of parking rod 52 can be temporarily retained and positioned by the recessed structure of bearing retainer 8d, when installing converter housing 8a on transmission case 8c.

The entire contents of Japanese Patent Application No. 2009-166442 (filed Jul. 15, 2009) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automatic transmission comprising:
a parking-lock mechanism accommodated in a transmission casing, for mechanically locking and unlocking a transmission output shaft of a speed-change system by engaging and disengaging the parking-lock mechanism with and from the transmission output shaft, wherein:
the transmission casing comprises a first casing and a second casing integrally connected to each other to form a housing configured to cover the speed-change system;
the parking-lock mechanism comprises:
a manual shaft configured to rotate in synchronism with a driver's shift-lever operation,
a parking rod whose longitudinal displacement is produced by rotary motion of the manual shaft,
a support actuator onto which a cam, attached to a tip of the parking rod, runs when a specified longitudinal displacement of the parking rod has been reached, and
a parking pawl configured to be pushed and moved by the cam when the cam has run onto the support actuator due to the specified longitudinal displacement of the parking rod so that the parking pawl is brought into meshed engagement with a parking gear installed on the transmission output shaft;
wherein the manual shaft and the parking rod are installed on the first casing, whereas the support actuator and the parking pawl are installed on the second casing;
wherein a temporary-retaining structure is provided on a face of the first casing facing the second casing, for temporarily retaining the cam attached to the tip of the parking rod;
wherein the speed-change system comprises a main transmission device and a sub-transmission device;
wherein an internal space of the transmission casing is sectioned into three sections including:
a first transmission area configured to accommodate the main transmission device,
a second transmission area configured to accommodate the parking-lock mechanism, and
a third transmission area configured to accommodate the sub-transmission device; and
wherein the temporary-retaining structure is provided on a bearing retaining wall through which the second transmission area and the third transmission area are sectioned from each other, the bearing retaining wall being configured to support the transmission output shaft; and
wherein the temporary-retaining structure comprises:
a first temporary-retaining rib portion provided to temporarily retain and position an upper portion of the cam attached to the tip of the parking rod in a transverse direction of the parking rod, and
a second temporary-retaining rib portion provided to temporarily retain and position a lower portion of the cam attached to the tip of the parking rod in the transverse direction of the parking rod.

2. The automatic transmission as claimed in claim 1, wherein:
the temporary-retaining structure is formed integrally with the bearing retaining wall fixedly connected to the first casing.

* * * * *